Dec. 30, 1969     D. G. MILLER ET AL     3,486,833

HIGH TEMPERATURE COMPOSITE GAS TURBINE ENGINE COMPONENTS

Filed May 5, 1967

INVENTORS
Donald G. Miller &
BY Richard H. Singleton

George A. Grove
ATTORNEY

United States Patent Office 3,486,833
Patented Dec. 30, 1969

3,486,833
HIGH TEMPERATURE COMPOSITE GAS TURBINE ENGINE COMPONENTS
Donald G. Miller, Indianapolis, Ind., and Richard H. Singleton, Pittsburgh, Pa., assignors to General Motors Corporation, Detroit, Mich., a corporation of Delaware
Filed May 5, 1967, Ser. No. 636,325
Int. Cl. F01d 5/28, 5/18; F03d 1/04
U.S. Cl. 416—241                                    2 Claims

ABSTRACT OF THE DISCLOSURE

Portions of nonrotating gas turbine engine components, such as the leading edge of a turbine stator vane, fabricated of the intermetallic compound NiAl will satisfactorily resist corrosion and structural failure in operation at temperatures of 2200–2500° F.

---

The invention herein described was made in the course of work under a contract or subcontract thereunder with the Department of Defense.

This invention relates to components of gas turbine engines and the like which are capable of withstanding relatively high temperatures. More particularity, this invention relates to composite nickel aluminide-nickel based alloy components which are capable of operating for prolonged periods of time when subjected to temperatures of 2200–2500° F. and of withstanding repeated fluctuation in temperature between this high temperature range and temperatures below 350° F.

In many areas of technology mechanical machine and engine design skill has exceeded the capabilities of materials to operate under the conditions imposed by the design. This is especially true in gas turbine engines and other machines designed to operate at temperatures in excess of 2000° F. For example, it is known that more efficient thermal engines can be built if substantially higher operating temperatures can be tolerated. In the case of a gas turbine engine, the highest operating temperatures which are actually "felt" by a component or portion thereof, are encountered at the inlet portion of the turbine. At the present state of the art, maximum tolerable temperatures at the first stage of the turbine are in the order of 2000° F. Above this level, nickel-based super alloys currently employed in this environment erode, corrode, and structurally fail under the stresses imposed in these severe conditions.

Accordingly, it is an object of the present invention to provide a composite nickel-base alloy-nickel aluminide (NiAl) article suitable for use in a gas turbine engine at temperatures of 2200–2500° F.

It is a more specific object of this invention to provide a turbine stator vane wherein the leading edge, and/or the trailing edge, thereof is formed of nickel aluminide and the rest of the vane is comprised of a nickel-base alloy.

It is a further object of this present invention to provide a thermocouple probe assembly to be used in a high temperature region of a gas turbine engine which thermocouple probe is formed with a nickel aluminide tip enclosing and protecting the bimetallic junction of the thermoelectric couple.

These and other advantages are accomplished in accordance with the subject invention by preparing the intermetallic compound, nickel aluminide (NiAl), which is comprised of substantially equal atomic percentages of nickel and aluminum. It is important that this atomic ratio be maintained and that the intermetallic compound be as free as possible from contaminants to obtain optimum high temperature strength and corrosion resistance properties. Nickel aluminide in powder form is compressed and sintered into an article of predetermined configuration. In the case of a turbine blade, nickel aluminide is employed as either the leading or trailing edge of the structure, or both. In this embodiment, the major portion of the structure, including the fluid directing faces, is formed by investment casting nickel base super alloy. The leading and trailing edges are formed by pressure sintering pure nickel aluminide powder to a predetermined configuration. The nickel aluminide edges are brazed to the body portion of the vane. The structure so produced can be utilized as a stator vane. Critical high temperature areas of the vane are the leading and trailing edges and the nickel aluminide is particularly useful for withstanding temperatures up to 2200–2500° F. without rapid erosion, corrosion or mechanical failure. The vane preferably is hollow to provide for the passage of cooling air therethrough to control the temperature of the nickel-based super alloy at a level at which it maintains suitable physical strength.

Another embodiment of the invention is a thermocouple probe assembly suitable for measuring or controlling temperature in the hot section of the turbine. For example, a suitable thermocouple assembly is prepared by enclosing a thermoelectric couple in a nickel-based alloy sheath with a high temperature junction thereof exposed. The high temperature junction of the thermoelectric couple is enclosed within a nickel aluminide tip which is affixed to the nickel alloy sheath. The nickel aluminide tip protects the high temperature junction of the thermoelectric couple while being itself exposed to the same high temperature environment.

These and other objects and advantages of the invention will become more apparent in view of the following detailed description, reference being made to the drawings in which.

Figure 1:
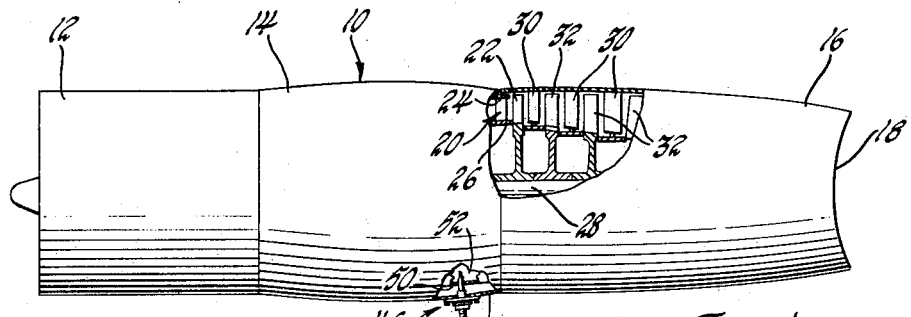
FIGURE 1 is a longitudinal view partly broken away and in section of a gas turbine engine such as is used to propel aircraft.

As seen in FIGURE 1, a gas turbine engine 10 is comprised of a compressor section 12, a fuel combustion chamber 14 and a turbine section 16. An axial flow compressor (not shown) located in compressor section 12 is adapted to draw in ambient air and suitably compresses it to a relatively high temperature and pressure. The axial flow compressor further blows the air into combustion chamber 14 where fuel is injected into the air and ignited to produce extremely hot gaseous combustion products. The hot combustion product gas is partially expanded through a turbine section 16 performing useful shaft work by causing the rotor portion of the turbine to rotate at extremely high speeds. The partially expanded gases are exhausted at the outlet end of the turbine section 18 to provide thrust for an airplane or the like. The work that is done in causing the turbine to rotate is employed to drive the compressor enclosed within compressor section 12.

In general, the greater the difference in temperature of the gaseous combustion products entering and leaving the turbine section 16, the more efficient the thermal engine device. This difference is most easily increased by raising the temperature of the gas entering the turbine section. However, for practical purposes the permissible inlet temperature of the combustion gas is limited by the high temperature strength, corrosion resistance and erosion resistance of the materials of construction of the turbine components and other associated components such as thermocouples which are employed in the high temperature region of the engine. At the present state of the art, the maximum permissible temperature at which hot compression gases are admitted to the turbine section 16 (turbine inlet temperature) is about 2000° F. for commercial gas turbine engines having a practical economic life. Certain portions of the gas turbine such as the turbine stator vanes, rotor blades, thermocouple probe and the like are particularly vulnerable to the high temperature combustion products. Portions of these components are directly impinged upon or acted upon by the hot gas and, unless cooled, they soon become heated to temperatures approaching that of the combustion gas. Obviously, such components, or portions thereof, must be able to withstand the corrosive high temperature environment. Turbine section rotor blades, thermocouple probes, stator vanes and the like are currently cast or otherwise formed from suitable nickel base alloys because these alloys have sufficiently high temperature strength, high temperature corrosion resistance and high temperature erosion resistance to operate for substantial periods of time at temperatures of up to about 1700–2000° F. An example of such an alloy is Inconel 713 which contains by weight about 6–10% molybdenum, 10–35% chromium, 4–8% aluminum, 0.1–3% titanium and 0.1–5% niobium, the balance being substantially all nickel.

The present invention provides practical means for increasing the maximum operable turbine inlet temperature. Nickel aluminide will withstand the corrosive hot combustion gas atmosphere at temperatures in the range of 2200–2500° F. Moreover, it has good physical strength at these temperatures. In most applications it is expected that only a portion of a turbine component will actually be heated to the maximum temperature of the working fluid. As the fluid exponds through a turbine it cools so that only the first stage, or few stages, actually operate at the severely high temperatures. Moreover, components such as rotor blades and stator vanes are typically provided with internal cooling passages which maintain much of the component at a suitably low temperature. However, the leading edge normally attains temperatures greater than any other part of the vane. Depending upon vane design, rate of internal cooling, and turbine inlet temperature, the trailing edge of the vane may also become significantly hotter than the body thereof. Therefore, in accordance with the invention these critical relatively highly heated portions of a turbine component are fabricated of nickel aluminide so that they can withstand the extreme temperatures. The rest of the component is preferably formed of a temperature resistant nickel base alloys so as to improve the physical porperties of the whole composite article.

Referring again to FIGURE 1, in a broken away portion is seen a turbine first stage stator vane 20 which is adapted to direct the flow of incoming hot combustion gases against the adjacent first stage rotor blade 22. While only one first stage vane 20 is shown, there are actually a number of identical vanes located circumferentially about the inlet to the turbine section 16. Stator vane 20 is affixed at its radially outer end to turbine section housing 24 and at its radially inner end to a hoop member 26, the housing 24 and hoop 16 cooperating to contain and direct the combustion gases so that they must flow against and by the vane 20. The combustion gases then impinge on rotor blade 22 which is attached to shaft 28 affecting a torque in the shaft and performing useful work thereby. Other state vanes 30 and rotors 32 are shown in the broken away section. It is noted that the succeeding blades increase slightly in size as the working gas expands.

Figure 2:
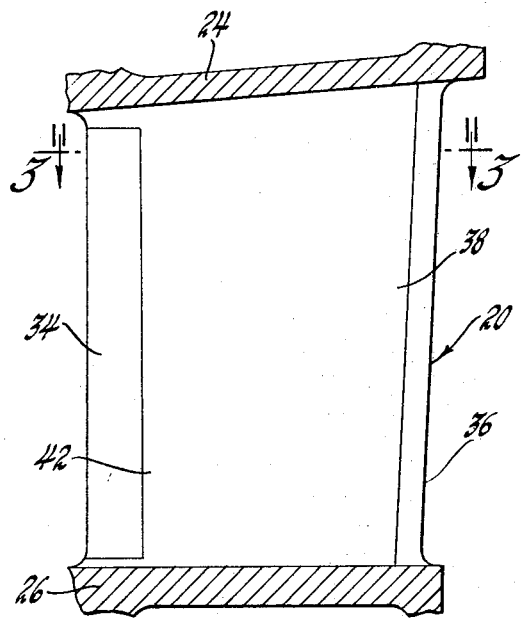
FIGURE 2 is an enlarged view of a stator vane member shown in a broken away portion of FIGURE 1.
Figure 3:
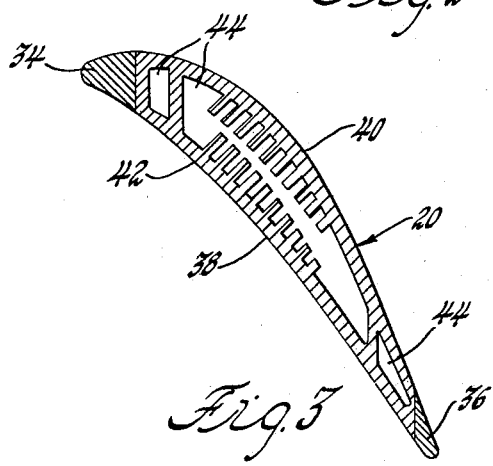
FIGURE 3 is a sectional view of the stator vane taken along line 3—3 of FIGURE 2.

A single first stage stator vane 20 is shown in more detail in FIGURES 2 and 3. The vane 20 has a substantially concave fluid directing surface 38 and a substantially convex fluid directing surface 40 which intersect at the leading edge 34 and trailing edge 36. Of course, the respective edges are so described because in operation the hot gas normally encounters edge 34 between flowing against surfaces 38 and 40 and edge 36. In accordance with the invention, leading edge 34 is formed of nickel aluminide. If, in operation of the engine, it is expected that trailing edge 36 or other portions of the blade will reach temperatures of 2200–2500° F., such portions will also be formed of nickel aluminide. The rest of the blade structure 42 other than the edge portions 34 and 36 is fabricated as a unitary member of a nickel base super alloy such as Inconel 713 described above. However, the NiAl leading edge portion 32 is as much as 1/16″ to 1/8″ or more in thickness from the tip thereof and is affixed to the nickel base alloy portion 42 by brazing or other suitable means. Also, as seen in FIGURE 3, the vane is fabricated so as to have one or more inner passages 44 through which compressed air which has bypassed the combustion chamber may be directed for the purpose of cooling the vane. Since the leading and trailing edge portions of the vane cannot be suitably cooled without impairing the structural strength thereof, nickel aluminide provides an excellent high temperature strength material for use in this critical region in relatively low stressed parts.

Figure 4:
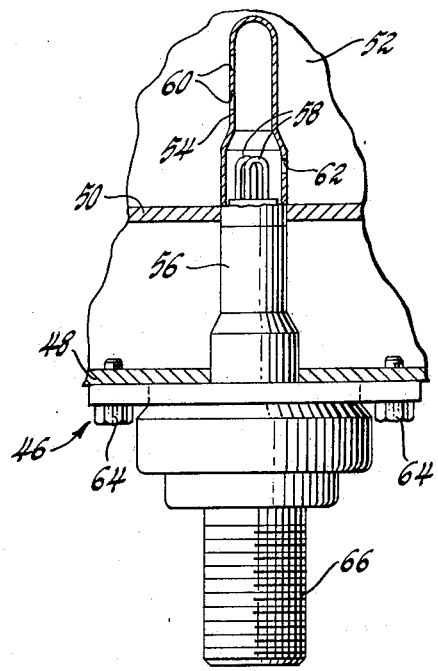
FIGURE 4 is an enlarged view of a thermocouple probe assembly shown in FIGURE 1.

In addition to a stator vane leading or trailing edge, our invention may be used in connection with turbine engine components such as thermocouple probe 46. In FIGURE 1 is shown a thermocouple probe assembly at the exit end of the combustion chamber 12 just prior to the entrance of the turbine section 14. Thermocouple probe in this region may be employed to measure the temperature of the combustion gases at this point, to function as part of a control circuit for regulating the amount of fuel injected into the combustion chamber and for other purposes. The probe, as shown in more detail in FIGURE 4, is mounted by bolts 64 to the outer housing 48 of the combustion section 14 and penetrates through the inner housing 50 into the combustion chamber 52. Normally, only the tip 54 is exposed to the hot gases, but the sheath portion 56 is immediately adjacent thereto and therefore is also subjected to relatively high temperatures. In the prior art a thermocouple assembly with the exception of the tip (54 in FIGURE 4) and the bimetallic thermoelectric couple leads (58 in FIGURE 4), has generally been fabricated of a nickel-based alloy. The tip portion which is subjected directly to the hot combustion gases has been formed of a relatively expensive platinum alloy. However, the platinum alloy does not withstand repeated thermal shock cycles between the operating temperature and shutdown temperature of the turbine engine. In accordance with our invention, this tip portion 54 is formed of nickel aluminide and affixed to sheath portion 56. The tip encloses and protects the bimetallic junction 58 from mechanical damage within the turbine combustion chamber. The thermocouple tip is provided with inlet holes 60 and outlet hole 62 to permit the passage of the hot combustion gas over the bimetallic junction 58. The wires comprising the thermoelectric couple are enclosed within the sheath or casing 56. A threaded portion 66 is provided in sheath 52 for connecting lead wires to the probe assembly 46. Nickel aluminide is readily brazed to nickel-based alloys and has a coefficient of thermal expansion sufficiently close to those of nickel containing metals so as to prevent severe stresses from thermal expansion and contraction. As in the case of the stator vane leading and trailing edges, the nickel aluminide thermocouple tip 54 may be expected to withstand temperatures in the range of 2200–2500° F. and repeated thermal shock cycles from this temperature range to below 350° F. without mechanical damage.

In order that nickel aluminide containing, composite turbine components have the desired properties stated above, it is preferred that the intermetallic compound be formed so as to contain substantially equal atomic ratios of nickel and aluminum and to be as free as possible from other elements or compounds. We have found that for purposes of our invention, nickel aluminide composite turbine components may be prepared in the following manner. Stock of high purity nickel (99.99% by weight) is melted in an Alundum crucible at 2800° F. and at a pressure of 4 x 10⁻⁴ torr by induction heating. The induction heating furnace is back filled with argon to a positive pressure of 5 pounds p.s.i. gauge, and electrolytic grade aluminum (99.99% purity) is added to the melted nickel in the stoichiometric quantity from a hopper positioned above the melt. It is desired to attain 68.5% by weight nickel and 31.5% aluminum or 50 atomic percent nickel and 50 atomic percent aluminum in the intermetallic compound. An exothermic reaction results from the addition of the aluminum to the nickel which increases the furnace temperature to approximately 3100° F. The melt is contained in the crucible until all signs of reaction such as turbulence and exothermic temperature rise are gone. The molten nickel aluminide is then poured into the cavity of a massive copper chill mold in an argon atmosphere, which mold quickly quenches and solidifies the molten material.

The cast ingot of nickel aluminide is fractured with a hammer into fragments suitable for further size reduction in a jaw crusher. The product of the jaw crusher is ball milled in toluene with aluminum oxide balls to 1–10 micron particle size. The toluene is evaporated at 125° F. to produce a powder suitable for hot compressing. Nickel aluminide powder thus produced has been found to contain 68.3–69.5% by weight nickel and the balance substantially all aluminum. The powder has assayed less than about 0.06% by weight carbon and only traces of copper, cobalt, calcium, iron, manganese, magnesium, silicon and hydrogen have been found. The oxygen content after ball milling has run as high as 0.5% by weight. It is preferred that the oxygen content be maintained at this value or lower.

The nickel aluminide powder is hot pressed in vacuum ($1 \times 10^{-4}$ torr) in graphite dies and sintered at 2850° F. for 15 minutes under 6000 p.s.i. uniaxial pressure. Structures of various geometries including bars to determine physical properties, vane leading edge configurations and thermocouple probe tips, have been formed as described above. The physical properties of the hot compressed nickel aluminide are as follows:

Room temperature—strength $60 \times 10^3$ p.s.i.
Room temperature—modulus of rupture $104 \times 10^3$ p.s.i.
Stress rupture—1500° F., 100 hours, $20 \times 10^3$ p.s.i.
Charpy equivalent impact—6–14 in./lbs.
Thermal conductivity—40 B.t.u. foot/hour·foot² F. °
Thermal expansion—$7.45 \times 10^{-6}$ inch/degree F. (to 2000° F.).

In order to evaluate nickel aluminide in a composite turbine engine component, a number of leading edges were hot compressed in a multicavity graphite susceptor die under the conditions defined above. After removal from the hot press die, the nickel aluminide leading edges were vacuum brazed to hollow air cooled Inconel 713 first stage vanes as leading edges to replace the original edge which had been removed by milling. A nickel base braze alloy comprises of 16% by weight tungsten, about 1–2% silicon and the balance nickel was employed in powder form. The braze cycle was accomplished in vacuum (less than $1 \times 10^{-4}$ torr) at 2200° F. for 2 minutes. The composite first stage stator vanes were tested in an engine and found to be operable at turbine inlet temperatures of 2200–2500° F. Excellent erosion resistance and impact strength were demonstrated. The engine has also been tested using thermocouple probe assemblies wherein the tip portion was formed of a nickel aluminide which was brazed to a Hastelloy X sheath member. Composite structures so produced have survived 5600 cycles of thermal shock, each from 2450° F. to 350° F. in 4 seconds, without failure.

It is preferred that nickel aluminide be employed in accordance with the invention as part of a nonrotating turbine engine component. The life of the nickel aluminide portion of a rotating part, such as a turbine rotor blade, is reduced because of the relatively high stresses exerted upon these components in engine operation.

While our invention has been described in certain specific embodiments thereof, it is appreciated that other forms might readily be adapted by one skilled in the art, therefore, the invention is not to be considered limited only to those embodiments specifically disclosed.

We claim:
1. A gas turbine engine stator vane having leading and trailing edge members and fluid directing face members wherein said leading edge member consists essentially of the intermetallic compound nickel aluminide and said trailing edge member and fluid directing face members are comprised of a nickel-based alloy, said nickel aluminide having substantially equal atomic proportions of nickel and aluminum.
2. A gas turbine engine stator vane having leading and trailing edge members and fluid directing face members wherein said leading and trailing edge members consist essentially of the intermetallic compound nickel aluminide and the rest of said stator vane is comprised of a nickel-based alloy, said nickel aluminide having substantially equal atomic proportions of nickel and aluminum.

References Cited

UNITED STATES PATENTS

| | | | |
|---|---|---|---|
| 3,049,869 | 8/1962 | Grenoble | 60—35.3 |
| 3,129,069 | 4/1964 | Hanink et al. | |
| 3,215,511 | 11/1965 | Chisholm et al. | |
| 3,275,295 | 9/1966 | Caldwell et al. | |
| 3,312,108 | 4/1967 | Avery | 73—359 |

OTHER REFERENCES

Mechanical Engineering, March 1965, vol. 87, No. 3, pp. 52–57.

EVERETT A. POWELL, Jr., Primary Examiner